US009285992B2

(12) United States Patent
Forgette et al.

(10) Patent No.: US 9,285,992 B2
(45) Date of Patent: Mar. 15, 2016

(54) SYSTEM AND METHOD FOR OPTIMALLY CREATING STORAGE OBJECTS IN A STORAGE SYSTEM

(75) Inventors: Eric P. Forgette, Sunnyvale, CA (US); Daniel A. Sarisky, Sunnyvale, CA (US); Jonathan K. Rippy, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 88 days.

(21) Appl. No.: 13/328,039

(22) Filed: Dec. 16, 2011

(65) Prior Publication Data

US 2013/0159637 A1 Jun. 20, 2013

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC .............. *G06F 3/0605* (2013.01); *G06F 3/067* (2013.01); *G06F 3/0631* (2013.01)

(58) Field of Classification Search
CPC .................................................... G06F 3/0605
USPC ........................................................ 711/171
See application file for complete search history.

(56) References Cited

U.S. PATENT DOCUMENTS

| | | | | |
|---|---|---|---|---|
| 5,668,995 A * | 9/1997 | Bhat | ........................... | 718/104 |
| 6,763,442 B2 * | 7/2004 | Arakawa | ............... | G06F 3/0605 707/999.01 |
| 6,978,259 B1 * | 12/2005 | Anderson | ............. | G06F 3/0605 706/19 |
| 7,177,921 B2 * | 2/2007 | Taguchi | ........................ | 709/220 |
| 7,266,542 B2 * | 9/2007 | Doyle et al. | | |
| 7,292,957 B1 * | 11/2007 | Schell | ........................... | 702/182 |
| 7,356,601 B1 * | 4/2008 | Clymer et al. | ................ | 709/229 |
| 7,370,096 B2 * | 5/2008 | Gous et al. | ..................... | 709/221 |
| 7,392,360 B1 * | 6/2008 | Aharoni | ................ | G06F 3/0605 711/162 |
| 7,403,482 B2 * | 7/2008 | Izmailov et al. | .............. | 370/238 |
| 7,487,308 B1 * | 2/2009 | Dalal et al. | ................... | 711/162 |
| 7,516,457 B2 * | 4/2009 | Eilam et al. | ................... | 718/104 |
| 7,574,502 B2 * | 8/2009 | Clymer et al. | ................ | 709/224 |
| 7,636,827 B2 * | 12/2009 | Asano | ................... | G06F 3/0605 707/999.202 |
| 7,710,900 B2 * | 5/2010 | Andrews et al. | .............. | 370/254 |
| 7,904,690 B2 * | 3/2011 | Batterywala | .......... | G06F 3/0605 711/170 |
| 8,095,764 B1 * | 1/2012 | Bauer | ................... | G06F 3/0605 711/162 |

(Continued)

OTHER PUBLICATIONS

Definition of pattern, Merriam-Webster Dictionary, retrieved from http://www.merriam-webster.com/dictionary/pattern on Oct. 8, 2013 (1 page).*

(Continued)

*Primary Examiner* — Tuan Thai
*Assistant Examiner* — Daniel C Chappell
(74) *Attorney, Agent, or Firm* — Gilliam IP PLLC

(57) ABSTRACT

Systems and methods that enable the optimal creation of a storage object within a virtual storage system are disclosed. In accordance with embodiments, an optimal location with the storage system is determined in response to receiving an indication that a storage object is to be created within the storage system. The system and method prioritize physical storage resources in which to create the storage object, prioritize components to be provided access to the created storage object, and prioritize the interface between the physical storage resources and the accessing component. The storage object is optimally created within the storage system based on the priorities and based, at least in part, on other created storage objects.

18 Claims, 6 Drawing Sheets

(56) References Cited

U.S. PATENT DOCUMENTS

| | | | |
|---|---|---|---|
| 8,121,874 B1* | 2/2012 | Guheen et al. | 705/7.11 |
| 8,140,475 B1* | 3/2012 | Sparks | 707/634 |
| 8,359,430 B1* | 1/2013 | Fair | 711/113 |
| 8,463,261 B2* | 6/2013 | Nader et al. | 455/434 |
| 8,621,176 B2* | 12/2013 | Schindler | 711/173 |
| 8,645,654 B1* | 2/2014 | Bailey | G06F 3/0605 711/165 |
| 8,775,773 B2* | 7/2014 | Acharya | G06F 3/0605 711/203 |
| 8,930,667 B2* | 1/2015 | Alatorre | G06F 17/30165 711/112 |
| 2002/0103969 A1* | 8/2002 | Koizumi et al. | 711/114 |
| 2002/0141351 A1* | 10/2002 | Maltz et al. | 370/254 |
| 2004/0123029 A1* | 6/2004 | Dalal et al. | 711/114 |
| 2004/0260813 A1* | 12/2004 | Heisserman et al. | 709/226 |
| 2005/0050270 A1* | 3/2005 | Horn | G06F 3/0608 711/114 |
| 2005/0278439 A1* | 12/2005 | Cherkasova | 709/223 |
| 2005/0289296 A1* | 12/2005 | Balasubramanian | G06F 3/0605 711/114 |
| 2006/0248546 A1* | 11/2006 | Andreev et al. | 719/328 |
| 2008/0123559 A1 | 5/2008 | Haviv et al. | |
| 2008/0140469 A1* | 6/2008 | Iqbal et al. | 705/7 |
| 2008/0183544 A1* | 7/2008 | Matsumitsu et al. | 705/8 |
| 2008/0235702 A1* | 9/2008 | Eilam et al. | 718/104 |
| 2008/0301255 A1* | 12/2008 | He et al. | 709/214 |
| 2009/0119673 A1* | 5/2009 | Bubba | 718/104 |
| 2009/0327179 A1* | 12/2009 | Strassner et al. | 706/14 |
| 2010/0050172 A1* | 2/2010 | Ferris | 718/1 |
| 2010/0122020 A1* | 5/2010 | Sikdar | G06F 3/061 711/103 |
| 2010/0124220 A1* | 5/2010 | Morris | 370/389 |
| 2010/0235599 A1* | 9/2010 | Akagawa | G06F 3/0605 711/163 |
| 2010/0274772 A1* | 10/2010 | Samuels | 707/693 |
| 2010/0333089 A1* | 12/2010 | Talwar et al. | 718/1 |
| 2011/0072253 A1* | 3/2011 | Iqbal et al. | 713/1 |
| 2011/0099351 A1* | 4/2011 | Condict | 711/216 |
| 2011/0179232 A1* | 7/2011 | Schindler | 711/154 |
| 2011/0283277 A1* | 11/2011 | Castillo et al. | 718/1 |
| 2012/0030319 A1* | 2/2012 | Andries et al. | 709/220 |
| 2013/0019011 A1* | 1/2013 | Breitgand et al. | 709/224 |
| 2013/0054888 A1* | 2/2013 | Bhat et al. | 711/114 |
| 2013/0054889 A1* | 2/2013 | Vaghani et al. | 711/114 |
| 2013/0054890 A1* | 2/2013 | Desai et al. | 711/114 |
| 2013/0054910 A1* | 2/2013 | Vaghani et al. | 711/162 |
| 2013/0054932 A1* | 2/2013 | Acharya et al. | 711/202 |
| 2013/0055248 A1* | 2/2013 | Sokolinski et al. | 718/1 |
| 2013/0159863 A1* | 6/2013 | Smith et al. | 715/734 |
| 2014/0068073 A1* | 3/2014 | Peles et al. | 709/224 |

OTHER PUBLICATIONS

Definition of virtual, Free Online Dictionary of Computing, retrieved from http://foldoc.org/virtual on Oct. 9, 2013 (1 page).*

The Basics of Service Level Management SLRs and SLAs, Feb. 9, 2012, retrieved from http://www.suntiva.com/blog/post/39/the-basics-of-service-level-management-slrs-and-slas/ on Sep. 24, 2014 (9 pages).*

Definition of resource, The Free Online Dictionary, retrieved from http://www.thefreedictionary.com/resource on Oct. 9, 2013 (1 page).*

Definition of component, Dictionary.com, retrieved from http://dictionary.reference.com/browse/component on Oct. 8, 2013 (1 page).*

International Search Report and Written Opinion issued for PCT/US2012/033899, dated Jun. 29, 2012, 8 pages.

* cited by examiner

SYSTEM AND METHOD FOR OPTIMALLY CREATING STORAGE OBJECTS IN A STORAGE SYSTEM

TECHNICAL FIELD

The present disclosure relates to virtual storage systems and, more specifically, to optimally creating storage in a virtual storage system.

BACKGROUND OF THE INVENTION

The term "virtual" is used frequently in computer arts, usually followed by the word "machine," "storage," or "server." In this context, "virtual" simply means that an element does not actually exist as a physical element, but rather as software that represents a physical element. Thus, virtual storage signifies an identity of a location for a client's storage, but the physical location where that client's data is stored, while controlled by a virtual identity, is not known to the client, but is known to the virtual machine with which a client interfaces. A virtual storage system may include multiple physical storage devices available for use by a server system to store information specific to one or more client systems. Each server in the server system may comprise multiple virtual machines and each virtual machine may comprise a separate encapsulation or instance of an operating system and one or more applications that execute on the server. As such, each virtual machine may have its own operating system and set of applications, and may function as a self-contained package on a server. Each server (or each virtual machine on a server) may execute an application for sending read/write requests (received from a user via a client system) for accessing data stored on a physical device. For example, a virtual machine application executing on a server in the server system may provide data to a user by receiving the user's access requests, executing the requests, and accessing the storage system to retrieve the requested data. Physical servers or controllers in the storage system access data from physical storage and provide that data in accordance with the requests. Servers in the storage system, like those in the server system, may comprise virtual machines installed thereon.

In virtual storage systems, techniques and mechanisms that facilitate efficient and cost effective storage of large amounts of digital data are common. For example, a network system of storage nodes may be implemented as a data storage system to facilitate the creation, storage, retrieval, and/or processing of digital data. Such a data storage system may be implemented using a variety of storage architectures, such as a redundant array of independent disks (RAID), network-attached storage (NAS) system, a storage area network (SAN), a direct-attached storage system, and combinations thereof. These data storage systems may comprise one or more data storage devices configured to store digital data within data volumes. The storage may be used to create virtual drives that span across physical devices or storage nodes at one location or across a large geographic location. In such systems, virtual drives that span across one or more physical storage resources such as devices, drives, groups of drives, or volumes allow a client to access data from distinct physical storage spaces as if it were doing so from a single physical drive. From a client's point of view, the virtual storage presents as one or more physical storage drives, yet the client does not have a view of the actual physical device storing its data.

Typically, when storage is added to the system or when existing storage is relocated within the system, a client manually selects the location or storage space for the new storage. Consider the case where a client pays for a certain level of storage service from a provider. In that case, the client may initially select an amount of storage space and/or speed at which the purchased storage can be accessed. Afterward, the client could determine that it is willing to pay more money for access to additional and/or faster storage. In such a case, a new a new virtual drive may need to be created. The client examines storage allocated to the client (e.g., perhaps across one or more storage nodes available to the client), determines available physical storage resources, and creates the new virtual drive from available physical storage. However, the client does so without knowledge of how creating the new virtual drive will affect the system's efficiency, and perhaps the speed at which the client may access its stored data. For example, the client may determine that it has several physical storage resources in which to create a new virtual drive, each of which are accessed by different machines, but the client does not know what else those physical resources are doing and thus cannot optimize overall performance.

According to known techniques, the client associates its new virtual drive with a storage controller irrespective of how its choice may impact performance. For example, associating the new virtual drive with a first available controller may create disparate user access patterns such that throughput is never maximized. On the other hand, associating the new virtual drive with a second available controller may enable high de-duplication, thereby saving disk space. In being forced to make an uninformed decision, the client is more likely to place the new virtual drive in a less than optimal location.

SUMMARY OF THE INVENTION

Systems and methods are established for optimally creating storage objects (e.g., virtual storage instances, virtual drives, virtual containers, etc.) in a storage system and/or providing optimal access to the optimally created storage objects. Storage objects are created according to embodiments by associating physical storage resources (e.g., physical disk resources, physical memory resources, etc.) as well as components that facilitate operation of and access to the created storage object (e.g., storage media controller components, network interface components, etc.). Optimally creating a storage object may consider not only physical resources within the system, but also virtual resources (e.g., virtual controllers utilized in providing a network interface facilitating access to the virtual storage instance, virtual volumes utilized in virtual storage instance configurations, etc.) that may be utilized in optimized virtual storage instance configurations. In one embodiment, an optimally created storage object is based, at least in part, on expected access patterns and how they pertain to existing storage objects.

According to one embodiment, a storage object is optimally created in a storage system and optimally accessed by a client by associating a processing system, such as a server system or other processor-based system, with the storage object to facilitate access to one or more physical storage resources of the storage object. It should be appreciated that although the term client is used herein to denote a consumer or other beneficiary of storage services provided by a storage object, such a beneficiary need not be a client in the literal sense. For example, servers, storage systems, and even other storage objects may be the beneficiary of storage services provided by a storage object of embodiments.

A storage object herein may, for example, be created at the request of a client (e.g., a particular client system, such as a virtual machine or other system executing a particular application, may require bulk storage), where the requested storage may be associated with one or more attributes such as a service level requirement, which itself may comprise or be based upon a service level objective. In operation according to embodiments, physical storage resources within the storage system are examined to determine which of those resources are available for optimally creating a storage object according to the attributes associated with the newly-requested storage. Also, components that facilitate operation of and access to the created storage object are preferably examined to determine which of those resources are available components that facilitate operation of and access to the created storage object. For example, network interfaces, between the physical storage resources and the client system are examined to determine which of those interfaces are available for optimally providing access for the storage object according to the attributes associated with the newly-requested storage. Access to the storage object may be provided by a storage server executing virtual storage controllers that access the physical storage resources of the storage objects according to access requests received from the server system. Such virtual storage controllers are likewise configured in accordance with an examination of the particular components that facilitate operation of and access to the created storage object.

From the above it can be appreciated that a storage object of embodiments is optimally created in a storage system by identifying attributes such as a service level requirement for a storage object to be created from physical storage resources. In accordance with embodiments, attributes of the physical storage resources are examined to identify optimal physical storage resources that satisfy attributes associated with the desired storage object. Also, attributes of the storage controller are preferably examined to identify optimal storage controller components that satisfy attributes associated with the desired storage object. The aforementioned storage controller components may include virtual storage controllers executing on a server under the control of the storage controller which may access the storage object. An optimal virtual storage controller of embodiments, which may be a virtual machine, will store or be associated with control components of the storage object, such as operational files of the created storage object. Thus, physical storage resources and a storage controller component are selected with which to create the storage object to provide an optimized configuration of the created storage object according to embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
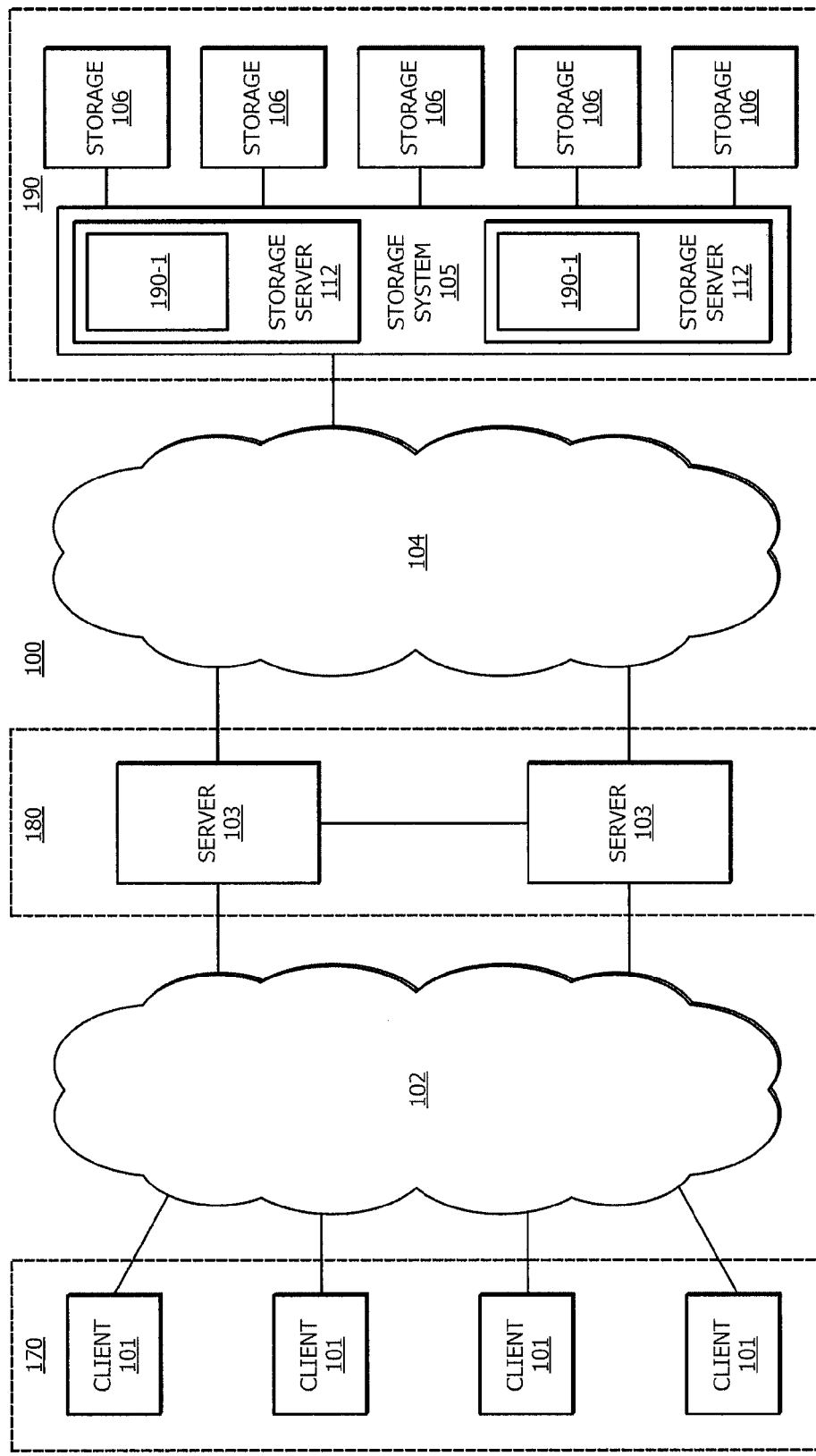
FIG. 1A is a block diagram of an exemplary virtual storage system according to certain embodiments.

A brief description of the meaning of particular terms as used herein is provided below in order to aid the reader in better understanding the concepts of the invention as described in the discussion which follows. Although the following provides general meanings with respect to particular terms, it should be appreciated that additional meaning with respect to certain of the terms herein may be provided in the context of particular embodiments discussed below.

A virtual machine is a software implementation of a machine (e.g., a computer or server) that executes programs like a physical machine and comprises a guest operating system installed within a normal host operating system. A virtual machine may comprise a separate encapsulation or instance of an operating system and one or more applications that execute on, e.g., a server. As such, a virtual machine may have its own operating system and set of applications, and may function as a self-contained package on a server. For example, to access data from a storage system, a virtual machine may execute an application for sending read/write requests for accessing data within a storage object.

A storage object is a virtual storage entity (e.g., virtual storage instances, virtual drives, virtual containers, etc.) comprising data that maps physical storage resources and associated components that facilitate operation and access to the physical storage resources as a logical or virtual storage resource. Accordingly, a storage object may aggregate various resources (physical resources and in some cases virtual resources), determined to be logically related to cooperate as a logical entity. Physical storage space for a storage object may be allocated as a flexible form of traditional storage, e.g., a resizable data container. As such, storage objects may be created, deleted, resized, or moved within a storage system. A storage object may comprise both data (e.g., an uninterpreted sequence of bytes) and metadata (e.g., an extensible set of attributes describing the storage object). Access commands or requests may be used to write bytes to and read bytes from individual storage objects and/or establish or retrieve attributes of storage objects.

According to one embodiment, when a storage object is created, data providing various configuration and/or operational attributes of the storage object may be created. As such, a storage object may comprise not only a resultant virtual storage entity created within physical storage resources, but also corresponding operating data accessed or called to facilitate access to physical storage resources defining the storage object.

The aforementioned storage object data may be provided in configuration files, physical storage descriptor files, and the like, such as may be created in a directory, folder, or other suitable storage instance and stored on a physical or virtual machine associated with the storage object. Additionally or alternatively, storage object data utilized to access physical storage resources from which a storage object is created may be stored in a non-hierarchical system. As an example, storage object data may be stored as metadata blocks accessed by a controller, where the blocks are partitioned according to what storage resources the metadata blocks are associated with. In such case, the metadata blocks may actually be stored at the same physical resources or stored in separate memory.

Physical storage resources are physical entities that may be aggregated to provide the physical storage space from which a storage object is created. Physical storage resources may include physical storage containers, disks, aggregates of disks, portions of disks (e.g., blocks, sectors, tracks, etc.), volumes, data repositories, storage systems, etc. A physical storage resource may be defined to comprise aggregates of disks (e.g., a traditional volume) and/or flexible volumes (e.g., volumes built on top of traditional volumes as a form of virtualization) using logical and physical data block mapping techniques. Portions of a physical storage resource, such as files necessary for accessing the physical storage may be placed in directories or other appropriate storage instance associated with or called by a machine accessing the physical storage.

Although the term disk is used herein, the use of the term in many contexts herein is not intended to be limited to the traditional magnetic or optical disk memory configurations. The concepts of the present invention are applicable to the use of various storage media in addition to or in the alternative to traditional disk storage configurations. For example, physical storage resources of embodiments may comprise solid state memories (e.g., flash memory, random access memory (RAM), etc.). Accordingly, it should be appreciated that the term disk as used in particular contexts herein is intended convey storage media which include suitable memories in addition to or in the alternative to traditional magnetic or optical disk configuration.

A virtual storage controller is a virtualized instance of a storage controller, and thus comprises a virtual machine. Embodiments of virtual storage controllers herein are adapted to provide access to physical storage resources of a storage object. For example, a virtual storage controller executing on a storage server may map (or make visible) physical storage resources of a storage object to present the storage object as an entity. A virtual storage controller of embodiments may provide a common mechanism for managing all storage objects within the storage system or within a storage node. Additionally or alternatively, various virtual storage controllers may provide different mechanisms for managing storage objects having similar or compatible service level requirements, service level objectives, etc.

A node is a network-connected device operating unit, such as a processor-based system (e.g., computer, network appliance, etc.) and associated instruction set (e.g., software, firmware, application, etc.), operable to provide a desired function, service, or operation, or portion thereof, and which may cooperate with other nodes to form a cluster. As such, a node may be, for example, a storage device, a storage controller, a storage system, a server computer, a blade server, a client computer, and the like.

A cluster as used herein is a group of linked or otherwise associated nodes operable together to provide a desired function, service, or operation thereby, in many respects, forming a single logical entity. A cluster may, for example, comprise a plurality of storage devices cooperating to provide a storage system or some portion thereof.

Embodiments described herein relate to systems and methods for optimally creating storage objects in a storage system and/or providing optimal access to the optimally created storage objects. For example, a new storage object may be created in response to a request from a client for new storage or by reconfiguring storage objects by adding, deleting, and/or resizing existing storage objects, such as to rebalance data across the storage system. For brevity, whether a storage object is created in response to a request for new storage or as reconfigured storage, in either case, the storage object will be referred to herein as a "new" storage object.

Certain embodiments, when creating the storage object, consider physical storage resources from which the new storage object is created, components that will access the created storage object, and the network interface there between. Embodiments may consider not only physical storage resources within the system, but also virtual resources (e.g., a virtual storage controller) that will access those physical storage resources.

According to one embodiment, a storage object is optimally created and optimally accessed by a client by associating a processing system, such as may comprise a server system or other processor-based system acting as a client to a storage system for storage services, with one or more physical storage resources. For example, a server system may receive a request from a client (it being appreciated that the server may have clients associated therewith while the server is itself a client to the storage system for storage services) for new storage, where the new storage may be associated with one or more attributes such as a service level requirement. Physical storage resources within a storage system accessible to the server system are preferably examined to determine which of those resources are available for optimally creating a storage object according to the attributes associated with the newly requested storage. Also, network interfaces between the physical storage resources and the server system are examined to determine which of those interfaces are available for optimally providing access to the storage object for the server system according to the attributes associated with the newly requested storage. Access to the storage object for the server system may be provided by a storage controller, such as a virtual storage controller, executing on a storage system.

A storage object is optimally created in a storage system according to embodiments herein by identifying attributes such as a service level requirement for a storage object to be created from physical storage resources. Attributes of the physical storage resources are preferably examined to identify optimal physical storage resources that satisfy attributes associated with the desired storage object. Also, because creating a storage object herein may comprise determining an optimal virtual storage controller or provisioning a new optimal virtual storage controller, attributes of one or more storage controller are preferably examined to identify optimal virtual storage controller components that satisfy attributes associated with the desired storage object. The optimal virtual storage controller component will store or be associated with control components of the storage object, such as operational files of the created storage object. Physical storage resources and a virtual storage controller component are selected with which to create the storage object to provide an optimized configuration of the created storage object.

To optimally create a new storage object, physical storage resources are examined across the storage system to determine which physical storage resources qualify as potential resources for creating a new storage object. According to one embodiment, to determine which physical storage resources qualify as potential resources for a new storage object, the type of the new storage object is determined. Once the type of new storage object is determined, the service requirements for the new storage object are evaluated. Service requirements for the new storage object may include 1) a client's service level objective (SLO) associated with the storage object, and/or 2) the performance requirements of the storage object itself. Only those physical storage resources that can accommodate the service requirements of the new storage object will suffice as qualifying physical storage resources.

To provide optimal access to a new storage object, network interfaces between physical storage resources and components such as servers (or virtual storage controllers executing on servers) are examined across the system to determine which network interfaces qualify for the new storage object. Within the storage system, physical storage resources are communicatively coupled to one or more storage servers via a network interface. Several physical storage resources are typically contained within a storage node and determining an optimal location with the storage system may involve searching across several storage nodes. Each storage node will include a number of network adapters that couple to the network interface via those network adapters. Most likely, some network adapters (and therefore, some network interfaces) will not accommodate the service requirements of the new storage object. Only those network interfaces that can accommodate the service requirements of the new storage object will suffice as qualifying network interfaces according to embodiments of the invention.

The determination of whether particular resources (e.g., storage resources, storage controllers, network interfaces, etc.) qualify for use in creating a desired storage object can be determined according to an instruction set (e.g., software, firmware, application, etc.) executed by a processor-based system of a storage system. Such an instruction set may be configured in a number of ways. For example, a storage manager or other user may provide a set of conditions or parameters, such as may correspond to various service level requirements and/or service level objectives, that are to be satisfied by the resources if they are to be determined to qualify for the storage object. Additionally or alternatively, analysis of existing or past storage system operation may be utilized to derive a set of conditions or parameters, again such as may correspond to various service level requirements and/or service level objectives, that are to be satisfied by the storage resources if they are to be determined to qualify for the storage object. In operation, the instruction set may call for a controller or other component of the storage system to poll or otherwise retrieve system information to determine whether resources available within the storage system qualify (e.g., meet or substantially meet conditions or parameters of service level requirements and/or service level objectives associated with the desired storage object). The determination of whether a resource qualifies may be based on different considerations including, e.g., available bandwidth, access/traffic patterns, operating speed, and the like.

Once qualifying resources (e.g., qualifying physical storage resources, qualifying controller resources, and/or qualifying network interfaces) are identified, creating a new storage object using optimal physical storage resources is performed by identifying a storage node or nodes at which qualifying physical storage resources, storage controller resources, and network interface resources exist. Once a storage node satisfying that requirement is identified, the best or otherwise selected physical storage resources within that storage node are identified for use in creating the storage object. However, when a satisfactory storage node cannot be identified or when a satisfactory physical storage resource within an otherwise qualifying storage node cannot be identified, a new physical storage resource may be created. The new physical storage resource of embodiments will be created according to certain parameters to ensure it optimally satisfies the service requirements of the storage object. Whether a storage node and/or physical storage resource within a node are satisfactory can depend on a number of metrics. For example, a client's service level objective (SLO) may require a score of 75/100. The score can be derived by considering several factors, some of which may be weighted. Where the best available physical storage resource achieves only a score of 68/100, a new physical storage resource will be created according to parameters to ensure it achieves a score of 75/100 or higher.

Where more than one physical storage resource or more than one network interface exist at a common storage node and/or where several qualifying physical storage resources are found at more than one storage node, the determination of an optimal storage node will be refined by ranking qualifying physical storage resources and qualifying network interfaces. For example, the storage system may execute an instruction set (e.g., software, firmware, application, etc.) operable to provide raking of the qualifying physical storage resources by comparing attributes thereof to one another and/or to conditions or parameters, such as may correspond to various service level requirements and/or service level objectives, that are to be satisfied by the resources. Ranking qualifying physical storage resources and network interfaces may involve finding a priority, rating, or score among qualifying physical storage resources and network interfaces and may be based on different factors, some of which may be assigned weighted values. The ranking may be based on different metrics or a combination of metrics, some of which may be assigned weighted values.

In operation according to embodiments qualifying physical storage resources are ranked according to a degree of similarity between other storage objects of the node and the new storage object. For example, the type of data stored in physical storage resources of the other storage objects may be compared to the type of data that will be stored in the physical storage resources of the new storage object. The degree of similarity may be further determined by comparing metadata associated with the new storage object with metadata associated with such other storage objects. Other attributes associated with the new storage object, disk type, guest operating system, file sizes, etc., may be also be compared to the other storage objects of the node. Physical storage resources containing storage objects having the highest degree of similarity to a new storage object may receive the highest ranking (e.g., because storage objects of the same type are most likely to have similar access patterns). As such, creating a storage object from physical storage resources containing storage objects of the same type makes traffic patterns, bandwidth availability, and power consumption more predictable. According to other embodiments, physical storage resources comprising dissimilar storage objects may receive a high ranking. That is, it may be advantageous to create a storage object in physical storage resources containing storage objects that drive different access patterns. Doing so may operate to average out access patterns, where only a subset of stored objects contained in the storage node drive peak access patterns while others drive low access patterns.

As will be discussed in more detail, once optimal physical resources or an optimal storage node containing optimal physical storage resources is identified, an optimal storage controller for accessing those physical storage resources will also be identified. For example, an optimal virtual storage controller executing on the server will be identified to access the optimal physical storage resources. Similar to the ranking previously discussed, virtual storage controllers may be rated or scored according to a number of metrics. For example, virtual storage controllers may be ranked according to a degree of similarity between the type of operational files they already call and the type of operational files of the new storage object, the performance levels provided by the virtual storage controller, and the network interfaces available to the virtual storage controllers. In this way, described embodiments provide optimal creation of a new storage object by identifying optimal physical storage resources from which to create the storage object, optimal machines for accessing the storage object, and an optimal network interface there between.

FIG. 1A is a block diagram of an exemplary storage system 100 according to certain embodiments. Within system 100, clients 101 are generally located within client level 170, application servers 103 are generally located at server level 180 (it being appreciated that servers of server level 180 may operate as a client to the storage systems for storage services), and storage system 105 (including storage servers 112) and physical storage resources 106 are generally located at storage level 190. System 100 of the illustrated embodiment comprises application servers 103 connected to one or more clients 101 via network 102. Application servers 103 may each access one or more storage system 105 (each storage system 105 having a set of one or more physical storage resources 106) that are connected to application servers 103 via network 104 under the control of supervisory logic, such as a hypervisor. Note that application servers 103 are connected to each other, for example, either directly or via network 102 and/or network 104. This allows the servers to communicate with each other for working collectively to provide data access service to clients 101, for collectively hosting a plurality of virtual machines as described herein, etc.

Clients 101 may comprise a system that executes a client application and interacts with one or more of application servers 103 for submitting configuration and/or read/write access requests and for receiving data from or transmitting data to application servers 103 over network 102. In a virtualized storage system, clients 101 may comprise a terminal that may execute a client terminal application and interact over network 102 with one or more virtual machines executing on one or more of application servers 103 for submitting configuration and/or read/write access requests and for receiving data from or transmitting data to storage system 105 over network 104. A user may interface with the client application (e.g., through a user interface of the client application) to submit configuration and/or access requests.

One or more of application servers 103 may comprise a physical and/or virtual computer system that may execute a server application that interacts with clients 101 for receiving configuration and/or read/write access requests from, and for receiving data from or transmitting data to clients 101 over network 102. One or more of application servers 103 is connected to clients 101 over network 102 such as a local area network (LAN), an Ethernet subnet, a PCI or PCIe subnet, a switched PCIe subnet, a wide area network (WAN), a metropolitan area network (MAN), the Internet, and/or the like.

According to some embodiments, one or more of application servers 103 comprise a chassis hosting multiple instances of application servers 103, where each application server 103 hosts client systems embodied as virtual machines, where one or more virtual machines may be allocated to each client 101. A controller, such as a supervisor or hypervisor, may be installed on one or more of application servers 103 and execute thereon to allow multiple virtual machines to be run simultaneously on shared server hardware. The controller virtualizes servers and virtual machines, allowing a application server 103 to host operating systems of virtual machines to execute on the servers.

One or more application servers 103 may comprise a server node, which are processor-based systems, such as file server systems, computer appliances, computer workstations, etc. Accordingly, application servers 103 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

A server application executing on one or more of application servers 103 may provide data access services to clients 101 by receiving and processing access requests from clients 101 for data from storage system 105. In turn, a server application utilizes the services of storage system 105 to access, store, and manage data in a set of physical storage resources 106. Storage system 105 comprises storage servers 112 and may be coupled to one or more of application servers 103 over network 104 such as a local area network (LAN), an Ethernet subnet, a PCI or PCIe subnet, a switched PCIe subnet, a wide area network (WAN), a metropolitan area network (MAN), a storage area network (SAN), a Fibre Channel (FC) subnet, the Internet, or the like. In fact, in some embodiments one or more of application servers 103 may comprise a chassis hosting multiple instances of application servers 103 within a single chassis (e.g., a blade server chassis), with each instance of one or more of application servers 103 in communication with each other instance of one or more of application servers 103 in the chassis via network 104.

Interaction between application servers 103 and storage system 105 can enable the provision of storage services. That is, application servers 103 may request the services of storage system 105 (by submitting configuration and/or read/write access requests), and storage system 105 may respond to configuration and/or read/write access requests of application servers 103 by receiving or transmitting data to application servers 103 over network 104 (e.g., by exchanging data packets through a connection over network 104). According to the illustrated embodiment, storage system 105 comprises one or more storage servers 112. Each storage server 112 may host storage components embodied as virtual machines, where one or more virtual machines may be allocated to one or more of storage resources 106.

According to the illustrated embodiment, a controller, such as storage controller 190-1, may be installed on one or more of storage servers 112 at storage system 105. Storage controller 190-1, operating under processor control, stores in memory the capabilities of storage system 105 and physical storage resources 106 as well as their current configuration and client (or administrator) requirements. As will be discussed, storage controller 190-1 operates to attempt to group together on or near the same resources like storage requirements among clients. In this manner, as will be discussed, efficiencies of operation are achieved and it is then possible to reconfigure the storage network as desired to maintain balance and efficiency as demands or circumstances change. Storage controller 190-1 (of which there can be more than one) serves to control the selection of storage resources to meet a service requirement of one or more clients 101 and/or application servers 103 accessing storage system 105 and then monitors the selection over time to maintain the service requirement as efficiently as possible. If desired, storage controller 190-1 may maintain a map of clients 101, application servers 103, and/or storage servers 112 to their associated storage objects such that the storage network for that client and/or application server 103 is established when the client or client server requests access (e.g., via read or write requests) to data from storage. In this regard, storage controller 190-1 executing on storage server 112 has visibility to all or many elements of system 100 to facilitate establishing the proper network interface from time to time based on the already assigned storage object. As noted, there can be many storage controllers 190-1 and they can, if desired, be virtual machines.

It should be appreciated that storage controller 190-1 may be installed at various levels within system 100. According to the illustrated embodiment, one storage controller 190-1 is installed on each storage server 112. However, storage controller 190-1 may be, for example, distributed across several storage servers 112 such that a single storage controller 190-1 manages several storage servers 112 within storage system 105. According to further embodiments, some components of storage controller 190-1 may be installed at other levels of system 100 (e.g., server level 180 or client level 170). According to such embodiments, storage controller 190-1 may comprise components that interface with an end user and/or client and be readily tailored to a particular client's preferences, such as specific GUI schemes, individual user preferences, and the like. According to a preferred embodiment and referring to the embodiment illustrated at FIG. 1B, storage controller 190-1 is installed in d-module 108 of storage server 112. However, according to yet other embodiments, storage controller 190-1 may be installed on different components of storage server 112. That is, storage controller 190-1 may be installed on one of m-host 109, n-module 107, or d-module 108, or distributed across those modules. Further, storage controller 190-1 may have components distributed across levels of system 100, such that components reside at one level within 100 system (e.g., a client level) and other components reside at another level within the system 100 (e.g., a storage level).

Communications between storage system 105 and any of application servers 103 are typically embodied as packets sent over the computer network 104. One or more of application servers 103 may send an access request (a configuration and/or read/write access request) to storage system 105 for accessing particular data stored on the storage system. For example, one or more of application servers 103 may request the services of storage system 105 by issuing storage-access protocol messages formatted in accordance with a conventional storage-access protocol for accessing storage devices (such as CIFS, NFS, FCP, etc.). Access requests (e.g., configuration and/or read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, one or more of application servers 103 may issue access requests by issuing packets using block-based access protocols—such as the Fibre Channel Protocol (FCP), Internet Small Computer System Interface (iSCSI) Storage Area Network (SAN) access, or Fibre Channel over Ethernet (FcOE)—when accessing data in the form of blocks.

One or more of application servers 103 utilizes services of storage system 105 to manage data between client 101 and physical storage resources 106. Storage system 105 may comprise systems that access data stored in a set of one or more physical storage resources 106 and provide that data to application servers 103. That is, storage servers 112 in storage system 105 may comprise a physical and/or virtual computer system (e.g., a virtual machine) that may execute a storage server application that interacts with application servers 103 for receiving configuration and/or read/write access requests from, and for receiving data from or transmitting data to application servers 103 over network 104. Storage servers 112 within storage system 105 may operate under one or more storage controllers 190-1 to access data from physical storage resources 106 and provide same to application servers 103. That is, each storage server 112 within storage system 105 may comprise virtual storage controllers having access to physical storage resources 106.

Physical storage resources 106 may be any number of physical storage resources and comprise writable storage device media such as disk devices, video tape, optical devices, DVD, magnetic tape, flash memory, solid state memory, Magnetic Random Access Memory (MRAM), Phase Change RAM (PRAM), or any other suitable media adapted to store information (including data and parity information). It should be appreciated that physical storage resources 106 of storage system 105 may themselves comprise one or more modules, components, etc. In one embodiment, physical storage resources 106 comprise volumes (e.g., storing data at physical addresses that map to logical addresses in volumes) which are an implementation of storage of information onto disk drives, disk arrays, and/or other data stores (e.g., flash memory) as a file-system for data. Volumes can span a portion of storage devices, a collection of storage devices, or portions of storage devices, for example, and typically define an overall logical arrangement of file storage on physical storage resources 106. In one embodiment, a volume can comprise stored data as one or more files that reside in a hierarchical directory structure within the volume. Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

Each volume may have a file system implemented thereon. A file system implemented on the physical storage resources 106 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical unit numbers (LUNs).

Figure 1B:
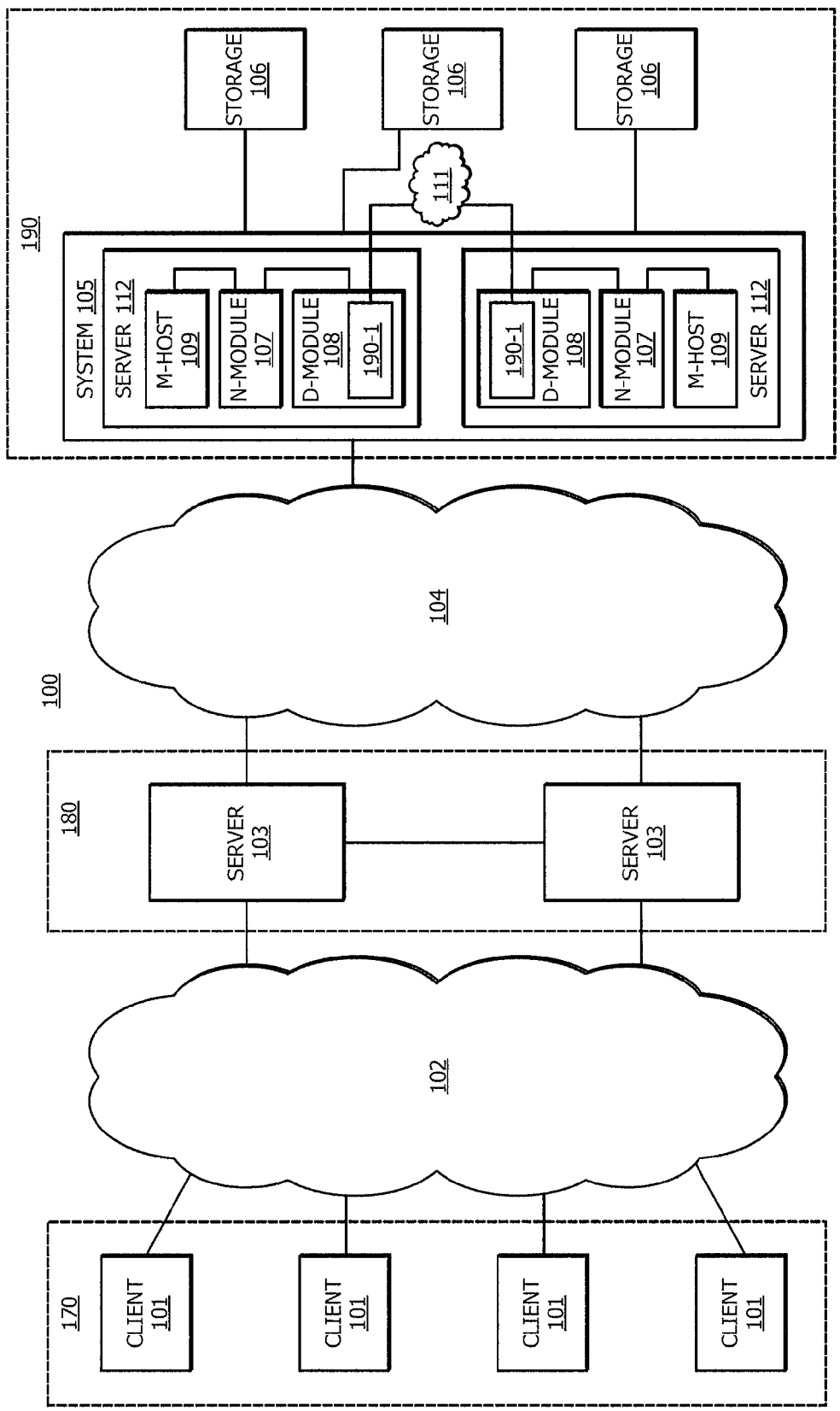
FIG. 1B is a block diagram in which additional details of the system shown in FIG. 1A are illustrated according to certain embodiments.

FIG. 1B is a block diagram in which additional details with respect to system 100 are illustrated according to certain embodiments. As stated above, system 100 may comprise application servers 103 to provide clients 101 access to data stored on a set of physical storage resources 106 via storage system 105. As will be further discussed, storage services may be provided by storage system 105 implementing various functional components, such as storage servers 112 and additional components residing thereon, that cooperate to provide a distributed storage system architecture of system 100.

Storage servers 112 located at storage system 105 may comprise one or more network elements (N-modules 107) and/or storage elements (D-modules 108) and a management element (M-host 109). N-modules may include functionality to enable storage system 105 to connect to application servers 103 over network 104, which connect to one or more clients 101 over network 102. D-modules 108 may provide connection to physical storage resources 106 (e.g., as may implement a storage array). In the exemplary configuration of system 100, clients 101 and/or application servers 103 may utilize storage system 105 to store and retrieve data from physical storage resources 106. In such an embodiment, for example, client 101 and/or application servers 103 can send data packets to N-module 107 in storage system 105 within storage level 190. Storage system 105 can forward the data to physical storage resources 106 using D-modules 108. In this way, in this example, client 101 can access physical storage resources 106, to store and/or retrieve data, using storage system 105 connected by network 104. M-hosts 109 may provide cluster communication services between storage system 105, e.g., via network 111, for generating information sharing operations and for presenting a distributed file system image for system 100. Functionality for enabling each node in storage system 105 to communicate with any other node in storage system 105 may be provided by M-hosts 109.

It should be appreciated that network 111 may comprise various forms, and even separate portions, of network infrastructure. For example, storage system 105 may be interconnected by a cluster switching fabric while storage system 105 may be interconnected to application servers 103 by a more general data network 104 (e.g., the Internet, a LAN, etc.).

It should also be noted that while there is shown an equal number of N and D-modules constituting illustrated embodiments of nodes, there may be a different number and/or type of functional components embodying nodes in accordance with various embodiments of the present invention. For example, there may be multiple N-modules and/or D-modules interconnected in system 100 that do not reflect a one-to-one correspondence between the modules of nodes in storage system 105. Accordingly, the description of nodes in storage system 105 comprising one N-module and one D-module should be taken as illustrative only and it will be understood that the novel technique is not limited to the illustrative embodiment discussed herein.

Clients 101 may be a general-purpose computer configured to interact with application servers 103 in accordance with a client/server model of information delivery. Clients 101 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. To that end, clients 101 may request the services of application servers 103 by submitting read or write requests. In response to the request, application servers 103 may return the results of the requested services by exchanging information packets over network 102. Clients 101 may submit access requests by issuing packets using object-based access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance. Preferably, clients 101 may implement a combination of file-based and block-based protocols to communicate with application servers 103.

In a distributed architecture, clients 101 may submit an access request to a server of application servers 103 for data stored at one or more of physical storage resources 106. As an example, an access request from client 101 may be sent to storage system 105 via application servers 103, which may target a virtual machine associated with, or having access to, operational files of a storage object (e.g., virtual drive) created within storage level 190 using physical storage resources 106. Storage servers 112 within storage system 105 may cache the operational files as directories in local memory and supervisory logic may manage which resources (e.g., physical storage resources and virtual storage controllers) are associated with those operational files.

D-modules 108 of storage system 105 may be adapted to communicate with physical storage resources 106 according to a storage area network (SAN) protocol (e.g., small computer system interface (SCSI), fiber channel protocol (FCP), INFINIBAND, etc.) and thus physical storage resources 106 may appear as locally attached resources to the operating system. That is, as seen from an operating system on application servers 103, physical storage resources 106 may appear as locally attached to the operating system. In this manner, application servers 103 may access data blocks through the operating system, rather than expressly requesting abstract files. According to the illustrated embodiment, d-module 108 executes storage controller 190-1 to control the selection of storage resources, such as storage 106, to meet a service requirement of one or more clients 101 and/or application servers 103 accessing storage server 112.

Figure 2:
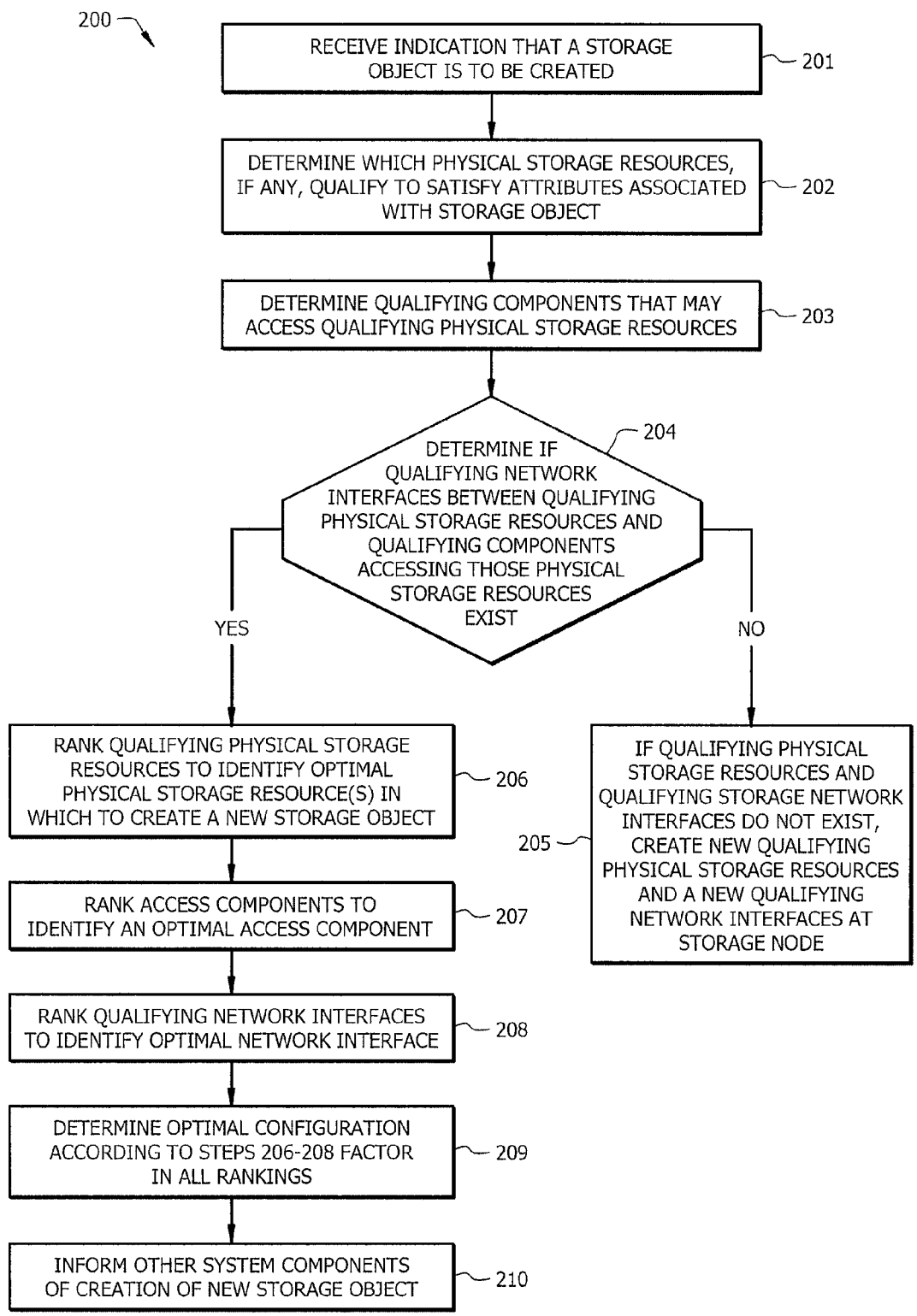
FIG. 2 is a block diagram illustrating steps performed according to a process to optimally create storage according to certain embodiments.

FIG. 2 illustrates steps performed according to process 200 in which a new storage object is optimally created within a storage system and/or existing storage objects are reconfigured within a storage system according to an embodiment. For brevity, whether a storage object is created in response to a request for new storage or reconfigured, the storage object will be referred to herein as a "new" storage object. According to a preferred embodiment, the steps illustrated at FIG. 2 are performed by a controller executing at a processor-based system of the storage layer (e.g., storage system 105 as illustrated in FIGS. 1A and 1B or controller 302 illustrated in FIG. 3). The controller may, for example, execute the steps in accordance with an instruction set (e.g., software, firmware, application, etc.) operable thereon. According to other embodiments, the steps illustrated at FIG. 2, or some portion thereof, may be performed by a processor-based system at a client level (e.g., at one of client 101 illustrated in FIGS. 1A and 1B), a processor-based system at a server level (e.g., at one of application servers 103 illustrated in FIGS. 1A and 1B), a processor-based system at a storage level (e.g., at one of storage system 105 illustrated in FIGS. 1A and 1B), a controller having components distributed across multiple levels, or, as discussed above, at one or more central controllers (e.g., at storage controller 190-1).

It should be appreciated that process 200 illustrated in FIG. 2 may be implemented in software whereby elements of embodiments are essentially code segments operable upon a processor-based or computer system to perform tasks as described herein. The program or code segments can be stored in a computer readable medium (e.g., RAM, ROM, disk memory, optical memory, flash memory, etc.). Also, the process illustrated in FIG. 2 may be executed by, e.g., firmware residing at system components or hardware in components, such as application servers 103 illustrated at FIGS. 1A and 1B, or as will be discussed, controller 302 illustrated at FIG. 3.

Process 200 is initiated upon receiving an indication that a new storage object is to be created within a storage system (e.g., system 100 illustrated in FIGS. 1A and 1B). The indication may comprise a request for additional storage from a client and/or a notification to rebalance storage across the storage system. Such a rebalancing request could be initiated, for example, at storage controller 190-1. As such, it may be desired to create a new storage object using optimal physical storage resources where a client requests additional storage or requests a higher level of service. Also, it may be desired to reconfigure existing storage objects both for the requesting clients and for clients using other storage resources. Rebalancing may be initiated, for example, by perceived poor system performance, passage of a time interval, occurrence of a determined event, a random status check, and/or the addition or deletion of clients within the system. Receiving such an indication triggers execution of one or more steps performed to effectuate optimal creation of a new storage object within the system.

In some embodiments, not every step discussed herein will be performed to effectuate optimal creation of a new storage object. Instead, it may be determined that one or more steps will not be performed as a function of various system factors, such as system size, system performance, system capacity, and the like. Some steps may not be performed to avoid unjustified computational expense where, for example, a client's level of service is a low tier, the system is determined to be operating within a desirable performance range or above a performance threshold, and/or there is insufficient system data available to perform every step. Also, in some embodiments, some steps may not be performed where it is determined early on that no physical storage resources, virtual storage controllers, and/or network interfaces exist within the system that satisfy service requirements of the new storage object. In those cases, a new physical storage resource, a new virtual storage controller, and/or a new network interface may be created or provisioned to accommodate the service requirements of the new storage object.

According to process 200, information for performing decision making steps to optimally create a new storage object is retrieved across the system. Information may be retrieved by examining one or more system databases to retrieve historical and/or current statistics. The retrieved statistical information may include performance data across physical storage resources and machines accessing those physical storage resources and be indicative of system performance as a whole, or may be more specific, including performance data for a specified group of physical storage resources or machines, perhaps only those available to a particular client. Components, such as virtual machines executing on one or more servers or storage controller 190-1 illustrated in FIGS. 1A and 1B, may be polled to evaluate real-time performance. Performance data may be retrieved directly from logical and/or physical storage resources such as physical storage devices, disks, groups of disks, aggregates, volumes, flash memory, and containers, and other components such as internal and external network interfaces, busses, and adapters (e.g., Host Bus Adapter targets and initiators). Information retrieval from various system components may be performed simultaneously, near simultaneously, or sequentially, where the retrieved information is later relied upon to perform subsequent decision making steps for optimal creation of a new storage object.

At step 201, an indication that a storage object is to be created within a the system is received. The received indication may comprise a request for additional storage from a client and/or a notification to reconfigure a storage object (e.g., rebalance storage across the storage system). The indication will include any number of attributes associated with a storage object, such as a service level requirement of the storage object, the amount and type of storage, speed of access, contemplated volume/unit of time, and the like.

At step 202, physical storage resources are searched across the system to determine which physical storage resources, if any, qualify to satisfy the attributes associated with the new storage object. For example, a determination of whether a physical storage resource satisfies the service requirements of a new storage object is made by determining both the type of new storage object and the service features of the physical storage resource. This determination is made whether the storage object is a newly created storage object that is to be initially created within the system or is a previously existing storage object that is to be reconfigured within the storage system. After the type of storage object is determined, the service requirements for the storage object are compared to the services provided by physical storage resources. The service requirements for the storage object may include 1) a client's service level objective (SLO) associated with the storage object, and/or 2) the performance requirements of the storage object itself. Only those physical storage resources that can accommodate, or substantially accommodate, the service requirements of the new storage object will suffice as qualifying physical storage resources according to embodiments of the invention.

With regard to a client's SLO associated with a storage object, a client's SLO may dictate a number of requirements that must be satisfied by a physical storage resource from which a storage object is created. For example, a client's SLO may specify parameters such as backup requirements, recovery safeguard requirements, replication requirements, absolute performance (e.g., disk type, aggregate size, number of disks, RAID level, volume size, etc.), relative performance, and latency to the client. According to an embodiment, an SLO may mandate capacity reservation in thin-provisioned and deduplicaton environments. Only physical storage resources that satisfy the client's SLO will qualify for consideration for use in optimally creating storage objects of embodiments.

With regard to the performance requirements of a storage object itself, some storage objects can accept low performance while other types require high performance. For example, storage objects that map to metadata-type data are better suited for high performance physical storage resources because they command relatively high input/output access patterns and typically provide for poor data de-duplication (i.e., data storage techniques where storage requirements are reduced by eliminating storage of multiple instances of redundant data). Using data de-duplication, only one unique instance of data is actually retained on storage media because redundant data is replaced with a "pointer" to a unique data copy. However, such data de-duplication techniques are not well suited for use with respect to metadata-type data. On the other hand, storage objects that map to many types of user data are better suited for low performance physical storage resources. Thus, it may be most appropriate to find lower performing resources when that is all that is required, to avoid dedicating overly expensive resources where they are best utilized. In this way, a high performance physical storage resource may not qualify in terms of cost. In any event, physical storage resources that cannot efficiently satisfy the performance requirements of a new storage object will, at best, offer subpar performance and will not qualify.

At step 203, qualifying components that may be utilized to facilitate access to qualifying physical storage resources of a storage object to be created are identified. Within the storage system of embodiments, various components of the storage system (e.g., servers within storage system 105 illustrated in FIGS. 1A and 1B) access physical storage resources (e.g., physical storage resources 106 illustrated in FIGS. 1A and 1B) from which a storage object may optimally created. The components may access physical storage resources under the control of, a storage controller (e.g. storage controller 190-1 illustrated in FIGS. 1A and 1B) installed across one or more of the storage servers. As such, virtual storage controllers are examined to identify which, if any, virtual storage controllers satisfy the attributes associated with the created storage object. A qualifying virtual storage controller of embodiments will be provided access to the storage object via that storage object's operating files, which may be stored in a directory accessible to or called by the qualifying virtual storage controller. The directory may be cached in local memory at the storage controller managing the qualifying virtual storage controller or in designated storage at the server in which the qualifying virtual storage controller executes. It should be appreciated, however, that embodiments may utilize a non-hierarchical system for storing and providing access to storage object data utilized to access physical storage resources according to embodiments of the invention. Once a qualifying virtual storage controller is provided with access to qualifying physical storage resources, data may be access and sent to servers within a server level (e.g., application servers 103 illustrated in FIGS. 1A and 1B) and ultimately the requesting client (e.g., client 101 illustrated in FIGS. 1A and 1B).

At step 204, qualifying network interfaces between physical storage resources and components accessing those physical storage resources are identified. For example, interfaces between one or more virtual storage controllers executing on a storage server having access to available physical storage resources are examined to determine which interfaces satisfy the attributes associated with the new storage object. A storage controller installed across one or more servers manages each virtual storage controller's access to physical storage resources. Identifying qualifying network interfaces involves similar determinations made to identify qualifying physical storage resources. For example, the service requirements for the storage object may be compared to the services provided by network interfaces. The service requirements for the storage object may include 1) a client's SLO associated with the storage object, and/or 2) the performance requirements of the storage object itself. Only those network interfaces that can accommodate the service requirements of the new storage object will suffice as qualifying network interfaces. According to a preferred embodiment, such a network interface may comprise a Host Bus Adapter (HBA) and/or components to facilitate Fibre Channel Protocol (FCP) access.

At step 205, if it is determined that qualifying physical storage resources and qualifying storage network interfaces do not exist, new qualifying physical storage resources and/or new qualifying network interface are created, either within an existing storage container or a new storage container. By way of example, where a client has requested a "gold level" of service where no physical storage resources and/or storage network interface qualifies or are otherwise unavailable, a storage container comprising appropriate physical storage resources and/or storage network interface and providing a "gold level" of service is created. A service level, such as a "gold level," may specify requisite features such as processing speed, network adapter speed and bandwidth, disk size, and the like. Also, as previously mentioned, a satisfactory storage container containing one or more satisfactory physical storage resources may be created by ensuring it achieves a certain rating or certain score that may be specified by the client. The score or rating may be derived from a number of metrics including speed, bandwidth, and the like.

At step 206, qualifying physical storage resources are ranked to identify optimal physical storage resource(s) from which to create a new storage object. According to a preferred embodiment, the ranking is performed by a controller executing at storage system 105 as illustrated in FIGS. 1A and 1B or controller 302 illustrated in FIG. 3. As mentioned above, the controller may retrieve information across one or more storage nodes within the storage system or may access system databases to extract various data useful in raking physical storage resources (e.g., current and historical system data). The controller of embodiments executes an instruction set (e.g., software, firmware, application, etc.) using the retrieved data as inputs to perform a ranking of qualifying physical storage resources. Qualifying physical storage may be ranked by finding a priority, rating, score among qualifying storage resources. The ranking may be based on different metrics or a combination of metrics, some of which may be assigned weighted values. By way of example, a physical storage resource 1) contained in a relatively new storage node with minimal existing traffic and/or 2) containing storage objects similar to the new storage object will likely achieve a high score because they will likely achieve advantageous traffic/access patterns, high throughput, and have sufficient available bandwidth. If all else is equal, the highest ranking physical storage resource(s) will be used to create the new storage object. However, distance from the client, access times, etc., may be utilized to modify the determination regarding the qualifying physical storage resources used in optimally creating the storage object.

Within step 206 of embodiments, qualifying physical storage resources are ranked according to a degree of similarity between storage objects already provided by those physical storage resources and the new storage object. For example, the type of data stored in qualifying physical storage resources may be compared to the type of data that will comprise the new storage object. The degree of similarity may be further determined by comparing metadata associated with the new storage object with metadata associated with storage objects already contained in qualifying physical storage resources. Other attributes associated with the new storage object, disk type, guest operating system, file sizes, etc., may be also be compared to storage objects already contained in qualifying storage objects.

According to some embodiments, physical storage resources having storage objects with the highest degree of similarity to a new storage object receive the highest ranking because, for example, storage objects of the same type are most likely to have similar access patterns. As such, creating a storage object from physical storage resources having storage objects of the same type makes traffic patterns, bandwidth availability, and power consumption more predictable. For example, consideration may be given to whether a new storage object is a direct clone of an existing storage object. A clone will have near identical access patterns to the original object, and therefore, according to an embodiment, it would be advantageous to create a clone in a physical storage resources containing the original virtual drive.

Further, the incremental utilization of memory space of physical storage resources is reduced by creating a new storage object with physical storage resources containing storage objects of the same type. That is, storage objects with a high degree of similarity yield the best de-duplication ratios (i.e., ratio of storage requirement reduction by de-duplication to storage requirement without de-duplication). For example, fingerprint files (e.g., hashed de-duplication signatures) of a new storage object may be compared to those within existing storage nodes. Files of the new storage object that have identical hashes to files of existing storage objects may not be created. Instead, internal links are created to reference data within the new storage object that, if created, would be merely duplicative of already stored data. As a result, data is not unnecessarily sent across the network, traffic patterns are minimized, and bandwidth and disk space are preserved. Generally, a new storage object will be created in physical storage resources that enables the best de-duplication ratios by default. However, according to some embodiments, a new storage object may be created elsewhere when other considerations weigh in favor of doing so.

Also, it should be appreciated that, according to embodiments, physical storage resources comprising dissimilar storage objects may receive a high ranking. That is, it may be advantageous to create a storage object in physical storage resources containing storage objects that drive different access patterns. Doing so may operate to average out access patterns, where only a subset of stored objects contained in the storage node drive peak access patterns while others drive low access patterns.

Additionally or alternatively within step 206 of embodiments, qualifying physical storage resources may be ranked according to their performance capabilities. For example, physical storage resources may be rated to determine which will most likely provide the best service for the new storage object. In this context, rating performance may involve considering several factors, such as recent and historical traffic patterns, bandwidth, and the like. Current and historical traffic patterns and available bandwidth of qualifying physical storage resources are determined to identify which, of qualifying physical storage resources, are most likely to provide the highest throughput. Doing so is useful during initial creation of a new storage object to ensure a user's access to a new storage object will not be constrained by bandwidth limitations. Also, evaluating traffic load is useful during a rebalancing process to indicate when overly-demanding storage objects should be reconfigured from one aggregate of disks to another.

At step 207, access components such as a storage controller managing access to physical storage resources from which a new storage object is created are ranked to identify an optimal access component. In one embodiment, a component of a storage controller installed across one or more storage servers is identified to access physical storage resources from which the new storage object is created. Doing so may involve storing operational files of the new storage object, perhaps within a directory, in an optimal component of the storage controller. Also, doing so may involve determining an optimal virtual storage controller (executing on a storage server under the control of the storage controller) to provide access to physical storage resources from which the new storage object is created. An optimal virtual storage controller will be provided access to the new storage object by associating the storage object's operating files with the optimal virtual storage controller. This may be done according to embodiments by caching the operational files in memory of the virtual storage controller or storing the operational files in storage at the server on which the optimal virtual storage controller is installed. During operation, the optimal virtual storage controller will call or access the operational files associated with the storage object to facilitate data access from the storage object.

According to an embodiment, within step 207 a virtual storage controller managed by the storage controller may be ranked by performing similar steps to those described with reference to ranking physical storage resources. That is, virtual storage controllers may be ranked according to a degree of similarity between the type of operational files they already call and the type of operational files of the new storage object, the performance levels provided by the virtual storage controller, the network interfaces available to the virtual storage controllers, etc.

It should be appreciated that, although embodiments described above include providing access to a new storage object by a virtual storage controller, the concepts described above readily apply to other implementations. For example, embodiments of the invention may operate to identify an optimal physical machine executing on a server and providing access to an optimally created storage object from the optimal physical machine.

At step 208, qualifying network interfaces are ranked to identify a network interface or an adapter available to that interface that will provide optimal access to a new storage object. Qualifying network interfaces are ranked in a manner similar to ranking physical storage resources. That is, network interfaces may be ranked where the best network interfaces are determined according to a variety of metrics, such as 1) the least busy, highest speed, and/or most reliable network interface; 2) the physical locality of the network interface to the client and underlying physical disks; 3) recent and historical bandwidth and throughput performance; 4) if applicable (HBA) Rate the "Recent command queue" of potential Network Interfaces; and 5) a mapping between the logical interface.

At step 209, an optimal configuration of the new storage object is determined by evaluating one or more of the rankings determined at steps 206-208. In this way, embodiments described herein determine an optimal creation of a storage object by determining optimal physical storage resources from which to create the storage object, optimal virtual components for which to provide access to the storage object, and an optimal network interface extending between the physical components and virtual components. An optimal storage object configuration may be determined in a variety of ways, such as by deriving a score based on the rankings determined above with respect to the qualifying physical storage resources, virtual components, and network interface. The rankings could be weighted or scaled according to client preferences, the relative importance of the particular aspect (i.e., physical storage resources, virtual components, and network interface) to the SLO, and/or the like. For example, a composite score could be derived from the rankings and assigned to each qualifying combination of physical storage resources, virtual components, and network interface. Once the optimal configuration is determined, a storage object is preferably created from the physical storage resources and its operational files are associated with a virtual storage controller that satisfies client's requirements executing on a server under the control of a storage controller to access the physical storage resources.

At step 210 other system components are informed of the physical storage resources in which the new storage object is created. Parameter information of the new storage object, such as identification of the storage node containing physical storage resources used to create the storage object and the virtual storage controller accessing those physical storage components, storage object service requirements, storage object size, and storage object type, are sent to other system components. System-wide adjustments may be made, as necessary, and attributes of the storage object are considered in subsequently creating new storage objects and in subsequent rebalancing procedures. Further, the client is informed of the new service afforded by the new storage object and now available to the client.

Figure 3:
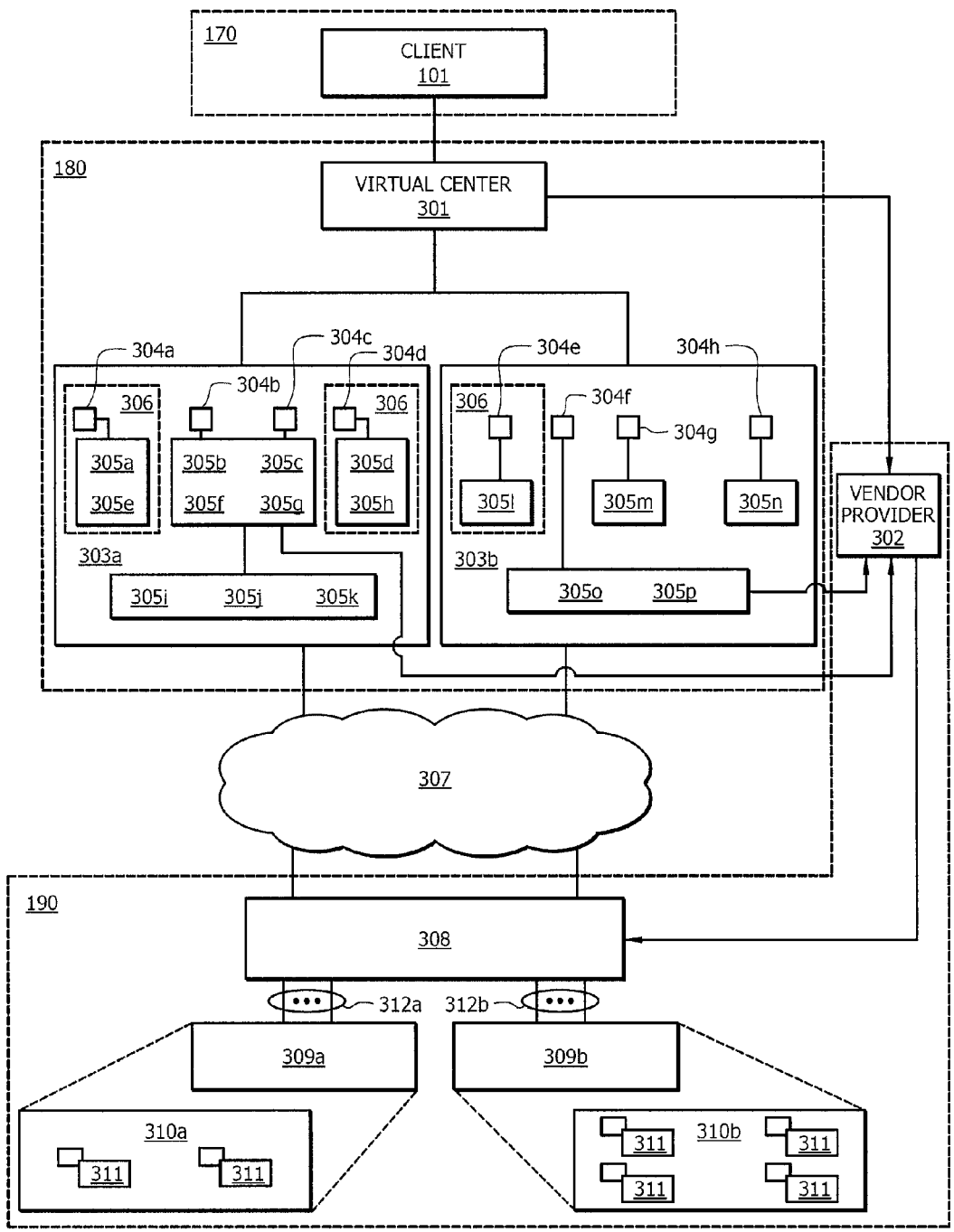
FIG. 3 is block diagram of system that enables optimal creation of storage according to a certain embodiment.

FIG. 3 illustrates storage system 300 that enables optimal creation of storage objects according to described embodiments. Specifically, FIG. 3 illustrates in detail components at a server level (e.g., server level 180 illustrated at FIGS. 1A and 1B) and a storage level (e.g., storage level 190 illustrated at FIGS. 1A and 1B) that enable optimal creation of storage in a virtual storage system. According to some embodiments, virtual center 301 is installed on servers of the server level (e.g., servers 303 corresponding to application servers 103 illustrated at FIGS. 1A and 1B) and performs supervisory functions such as managing virtual machines executing on those servers. For example, virtual center 301 provides management functions (e.g., inventory, start, stop, etc.) to hypervisors residing in system 300 which actually perform hypervisor-like functions, allowing different operating systems of one or more virtual machines 304 to execute concurrently on one or more servers 303. Further, as will be discussed in more detail, virtual center 301 and servers 303 communicate with vendor provider 302 to create, delete, reallocate and/or rebalance data stored at physical storage node 309 across one or more network interfaces in system 300.

Vendor provider 302 executes steps or manages the execution of steps to enable optimal creation of storage in a storage system as described herein. For example, vendor provider 302 contains logic that performs steps described at FIG. 2 and its accompanying description. To that end, virtual center 301 and vendor provider 302 comprise software executing on servers not only to provide clients (e.g., clients 101 illustrated at FIGS. 1A and 1B) access to existing storage, but also to enable the initiation of optimal creation of additional storage, such as to provide a storage object for use by one or more virtual machine 304. As such, vendor provider 302 (operating underneath or separate from virtual center 301) receives and processes access requests for 1) data from storage systems (e.g., storage system 105 illustrated at FIGS. 1A and 1B) via read/write access requests, and 2) access to additional and/or faster storage.

It should be appreciated that, vendor provider 302 may be installed at various levels within the virtual storage system. For example, some components of vendor provider 302 may be installed at the storage level of the virtual storage system (e.g., storage level 190 illustrated at FIGS. 1A and 1B). By way of further example, some components of vendor provider 302 may be installed at the client level of the virtual storage system (e.g., client level 170 illustrated at FIGS. 1A and 1B). According to such embodiments, vendor provider 302 may be more readily tailored to a particular client's preferences, such as specific GUI schemes, individual user preferences, and the like. According to yet other embodiments, vendor provider 302 may be installed at a storage level, such as storage system 105 as illustrated in FIGS. 1A and 1B. In such case, vendor provider 302 may be installed on one of m-host 109, n-module 107, or d-module 108, or distributed across those modules as illustrated at FIG. 1B to effectuate creation, deletion, and/or rebalancing of data across storage node 309. Further, vendor provider 302 may have components distributed across the system, such that components reside at one level within the system (e.g., a client level) and other components reside at another level within the system (e.g., a storage level). In any event, vendor provider 302 communicates with virtual center 301 to perform operations as described herein.

As will be discussed in more detail, vendor provider 302 enables optimal creation of a storage object by examining controller 308 and physical storage resources of storage node 309 to identify an optimum configuration of physical storage resources of storage node 309 for a storage object, such as may be created for an identified virtual machine 304. Vendor provider 302 further enables optimal creation of storage objects by identifying an optimum network interface 312 over network 307 between an optimal server 303 and optimal physical storage node 309.

Vendor provider 302 may be provided by an entity providing and maintaining access for one or more clients to stored data, e.g., NetApp, Inc. of Sunnyvale, Calif., and installed on servers operated by same or third party vendors or other entities. In some embodiments, vendor provider 302 may execute on a separate controller or processor that is communicatively coupled with multiple servers and/or storage systems across multiple nodes.

In providing optimal creation of a client's storage, vendor provider 302 may be communicatively coupled via virtual center 301 to a graphical user interface located at a client system (e.g., client 101) whereby a user at the client system interacts with system 300 to optimally create storage according to embodiments described herein. Optimally, for example, in accordance with process 200 of FIG. 2, creating storage comprises 1) determining the optimal physical storage resources from which to create a new storage object, 2) determining an optimal virtual storage controller to provide access to the storage object, and 3) determining an optimal network interface between the virtual storage controller and physical storage resources of the storage object. Different embodiments will provide for different levels of user interaction in optimally creating storage. For example, according to some embodiments, system 300 is configured to automatically execute steps corresponding to those described at FIG. 2 with little or no user input. In that case, a user may simply request additional storage and provide few or very basic specifications relating to that storage. Afterward, the user may be notified that its storage has been allocated according to its specifications. On the other hand, system 300 may present different categories of data via the GUI of vendor provider 302 to the user. For example, vendor provider 302 may display qualifying physical storage resources, qualifying virtual machines, and network interfaces within system 300 (e.g., storage nodes at which a qualifying physical storage resource, a qualifying virtual machine, and a qualifying network interface exist between the qualifying physical storage resource and virtual machine), a ranking or score of qualifying server and storage nodes, and the metrics upon which the ranking is based. The user may be afforded various levels of interaction where, e.g., the user may review the rankings or scores achieved by each server and storage node and manipulate the metrics (or the relative weight given to each metric) in deriving the ranking or score. Once the storage is optimally created, the client may then update itself or be prompted to update itself by system 300 to account for the new storage and operate with awareness of same going forward.

Servers 303 are managed by virtual center 301 and may operate to partition those servers 303 into multiple virtual machines that can run simultaneously while sharing the physical storage resources of the storage system. As mentioned, virtual center 301 executes instructions to allow multiple virtual machines 304 to execute simultaneously on shared server hardware and executes instructions to enable access requests from servers 303a and 303b to physical storage node 309 for data transfer there between. According to the embodiment illustrated at FIG. 3, four virtual machines 304a, 304b, 304c, and 304d, are shown under the management of server 303a and four virtual machines 304e, 304f, 304g, and 304h, are shown under the management of server 303b. Virtual machines 304 are associated with storage objects 305 defined by physical storage node 309 via operational files of storage objects 305 with which each virtual machine 304 is associated. These operational files may be associated with a corresponding virtual machine 304 by storing the files at designated storage on server 303, cached in memory at the virtual machines 304, or stored in a portion of storage node 309 accessible to the corresponding virtual machine. It should be appreciated that storage objects 305 of FIG. 3 are illustrated in server 303 hosing an instance of a virtual machine to which the storage object is associated because these storage objects are configured to appear as if they are local resources of the corresponding virtual machines. The physical storage resources providing these storage objects, however, are in actuality part of physical storage node 309.

Metadata that describes each virtual machine 304 of embodiments is stored in memory at server 303 in which that virtual machine 304 is contained. The virtual machine metadata is preferably accessible by vendor provider 302 and may be considered by vendor provider 302 in determining an optimum control component (e.g., an optimal component of controller 308) for operational files of a new storage object (e.g., a new storage object 305) created at physical storage node 309. For example, as previously discussed, the metadata for each virtual machine 304 may be read by vendor provider 302 to determine a degree of similarity between the virtual drives 305 (or the type of virtual drives stored therein) and the new storage object, and which virtual machines 304 are able to accommodate the service requirements of the new storage object.

Each virtual machine 304 is associated with one or more storage objects 305 and component of controller 308, where again, association may be achieved where controller 308 caches operational files of one or more storage objects 305. Controller 308 is able to call operational files to manage access requests to specific storage objects 305 with which it is associated under the direction of virtual center 301. For example, via controller 308, virtual machine 304a is associated with storage objects 305a and 305e while virtual machine 304b is associated with storage objects 305b, 305c, 305f, and 305g. Storage objects 305 appear to the operating system of virtual machines 304 as an ordinary physical drive and comprise a file system that maps data stored on one or more physical storage devices (e.g., physical storage node 309) to logical addresses that may be accessed by that virtual machine 304. Storage objects 305 may span across one or more physical disks or aggregates of disks comprising physical storage node 309.

According to some embodiments, one more of storage objects 305 may be used to create flexible volumes, such as those provided by NetApp, Inc. of Sunnyvale, Calif. In such embodiments, physical storage node 309 may be, e.g., SATA, Fibre Channel, or SAS disk drives, grouped into RAID groups or aggregates of RAID groups. The operating system of the virtual machines 304, e.g., NetApp's Data ONTAP operating system, may execute an instruction set (e.g., software, firmware, application, etc.) with respect to storage objects 305 to create flexible volumes within physical storage node 309. Flexible volumes are particularly advantageous when storage must be added, deleted, or reallocated, because each can be resized at any time.

As seen, one or more virtual machines 304 associated with accessing data via controller 308 from one or more storage objects 305 are created within a container 306. Containers 306 are logical entities that contain virtual machines 304 and storage objects 305 allocated to a client (e.g., one of clients 101 illustrated at FIGS. 1A and 1B). For example, a client such as a college, research and development facility, or a business unit within a corporate organization, may be provided one or more containers 306 in which a new virtual machine 304 and/or a new storage object 305 are to be created according to a client request or rebalancing procedure. According to the illustrated embodiment, containers 306 allocated to one client will not contain storage allocated to another client.

Containers 306 are tools that enable vendor provider 302 to more efficiently provide a client access to its data and determine an optimal physical storage resources for client storage. For example, containers 306 present logical views of a client's storage, service level requirements associated with that storage (e.g., a clients' SLO), and other rules or restriction in accessing data and/or creating storage in container 306. As such, vendor provider 302 may present data to a client via a GUI in terms of containers allocated to that client, whereby a user at a client may view available storage and service levels associated with the available storage. This allows a user to determine whether additional storage should be purchased before creating new storage within system 300.

Containers 306 also improve efficiency for vendor provider 302 in executing steps to determine optimal physical storage resources for storage. That is, instead of examining servers or physical storage components not allocated to a particular client, vendor provider 302 need only examine one or a few containers 306 to determine optimal physical storage resources for a client's storage.

According to the embodiment illustrated at FIG. 3, physical storage node 309 comprises hardware, including SAS Aggregate-type devices and SSD Aggregate-type devices that are logically grouped with one another. One or more physical storage node 309 may comprise a storage node containing physical assets such as the physical disk(s), CPU, memory, network interfaces, adapters, and the like. According to the embodiment illustrated at FIG. 3, physical storage node 309 correspond to physical storage resources (e.g., storage 106 illustrated at FIGS. 1A and 1B).

According to the illustrated embodiment, physical storage node 309 is accessed under the control of virtual center 301 and vendor provider 302. Physical storage node 309 is accessed via network 307 (e.g., implemented as an embodiment of network 104 illustrated at FIGS. 1A and 1B) and controller 308 (e.g., implemented as an embodiment of storage system 105 illustrated at FIGS. 1A and 1B). A logical view of physical storage node 309a and 309b presented by controller 308 to vendor provider 302 is represented by blocks 310a and 310b, respectively. Blocks 310 illustrate how physical components of physical storage node 309 are logically presented by controller 308 to vendor provider 302. As seen in blocks 310, physical volumes within physical storage node 309 are associated with one or more service levels 311, indicating a service requirement of data stored within those volumes, where as previously mentioned, a service requirement is defined in terms of a client's SLO and/or the service level of the stored data and virtual drive 305 mapped to that data. Accordingly, virtual machines 304 are associated with a service level 311, where virtual machines 304 are associated with the same service level 311 as storage objects 305 which they access.

Network interfaces 312 comprise logical and physical components that communicatively couple physical storage node 309 and components of controller 308. Components of controller 308 are coupled to network interfaces 312 via network adapters, which each have varying performance capabilities. Vendor provider 302 evaluates network interfaces 312 by, e.g., executing the steps described with reference to FIG. 2, to determine the optimal network interface 312. According to a preferred embodiment, determining an optimal network interface 312 involves creating protocol endpoints on either side of the interface, where the protocol endpoints are configured to provide optimal access from, e.g., a requesting virtual storage controller to the storage resources in which the object is created.

As illustrated at blocks 310, controller 308 views physical storage node 309 according to logical groups of physical storage, e.g., volumes, and how those volumes (or data stored in those volumes) are associated with a particular service level 311. Controller 308 provides access to storage node 309 for vendor provider 302. As previously discussed, a service level 311 may impose performance requirements on storage in which data is to be stored. To ensure its ability to execute steps to optimally create storage in the storage system, vendor provider 302 examines controller 308's logical view of physical storage node 309, the logical mapping between virtual drives 305 and physical storage node 309, and network interfaces 312 between physical storage node 309 and controller 308. Upon receiving an indication that a storage object (e.g., a storage object of storage objects 305) is to be optimally created, vendor provider 302 considers data gathered, e.g., through its functions to evaluate metrics used to identify an optimum controller 308 to provide access to a storage object and identify optimum physical storage resources within optimum physical storage node 309 to create that storage object. In identifying optimal physical storage resources, vendor provider 302 may also determine an optimal network interface between controller 308 and other systems of system 300, such as servers 303 and/or virtual center 301 (which supervises server 303), by executing the steps described with reference to FIG. 2. Doing so ensures that virtual center 301 (executing at one or more servers 303) and/or servers 303 accesses data from physical storage node 309 via controller 308 over an optimum network interface.

In operation, in accordance with the embodiment illustrated at FIG. 3, vendor provider 302 receives an indication that storage is to be created in system 300. The indication may comprise a client's request for access to addition and/or faster storage. For example, a client may need to store more data than what storage allocated to that client can accommodate or may need to have access to data at a rate faster than what storage allocated to that client can accommodate. The indication may additionally or alternatively comprise a notification that storage is to be rebalanced across system 300. For example, a storage object such as a virtual drive may need to be moved from one container 306 to another container 306 when, e.g., a rebalancing process must be performed. Rebalancing could be initiated on a periodic basis or upon the event of a condition or occurrence. For example, a rebalance procedure may be initiated when the performance of system 300 falls below a desired level or determined threshold, or when an additional an additional node is added to the system during expansion.

Once the indication is received, vendor provider 302 of embodiments polls servers 303 contained in containers 306 allocated to the client and controller 308 which provides a logical view of physical storage node 309 in which storage will be created. Vendor provider 302 may determine a number of features of virtual machines 304 and storage objects 305 including, e.g., the service levels 311 associated with virtual machines 304 and storage objects 305, the amount of available storage, the type of storage objects 305 associated with virtual machines 304, metadata associated with same, traffic load, bandwidth capabilities, etc. Vendor provider 302 also determines what physical storage node 309 maps to logical addresses of storage objects 305 contained in container 306 to identify what physical storage node 309 is available to the client. With that information, vendor provider 302 also polls controller 308 to examine physical storage node 309 defining storage objects 305 allocated to the client. When polling controller 308, vendor provider 302 determines a number of features of physical storage node 309 available to the client including, e.g., the service levels 311 associated with physical volumes stored in physical storage node 309, the amount of available storage, metadata associated with same, traffic load, bandwidth capabilities, etc.

Vendor provider 302 identifies what containers 306 are allocated to the client and analyzes virtual machines 304 and storage objects 305 in those containers. In doing so, vendor provider 302 considers service levels 311 associated with physical storage node 309 defining those storage objects and service levels 311 associated with virtual machines 304 which have access to those storage objects 305, available physical storage, and interfaces 312 between physical storage node 309 and controller 308 providing storage objects 305 in those containers 306.

Vendor provider 302 then executes steps described with reference to FIG. 2 to determine the optimal container 306 for the new storage object, the optimal virtual machine 304 in the optimal container 306 to provide access to storage object 305, the optimal physical storage node 309 from which storage object 305 may be created, and the optimal network interface 312 to utilize in providing access to physical resources of the storage object 305 from server 303 and ultimately the client. In doing so, it may necessary for vendor provider 302 to determine whether it should provide access to the new storage object 305 via an existing virtual controller of controller 308 or should create a new virtual controller. For example, vendor provider 302 may determine the best achievable score among available virtual machines 304, physical storage node 309, and available network interfaces 312 is 65/100. In that case, if the best score falls below a threshold or required service level, vendor provider 302 may instruct virtual center 301 to create a new virtual controller to provide access to new storage object 305.

In some cases vendor provider 302 may recognize that a new storage object 305 should be created for access to virtual machine 304. For example, it may be recognized early on that a new storage object 305 should be created to prevent breaking logical rules, such as a rule that two containers 306 should not share a storage object 305. Perhaps a client desires a gold level of service, where the client previously subscribed to a silver level of service. If a gold level virtual machine 304 is associated with physical storage resources of storage node 309 that are unavailable (e.g., is full or near full, or otherwise unable to accommodate a client's request), a new virtual machine 304 and associated storage object may be created. Also, in the event a new storage node has recently been created in one of containers 306 allocated to the client, vendor provider 302 may notice that several network interfaces 312 within the new storage node have low access activity or that the new storage node has very little memory being utilized. In those cases, vendor provider 302 will readily recognize that a higher score may be achieved for a client by creating a new storage object and will avoid the computational expense of evaluating remaining considerations.

Figure 4:
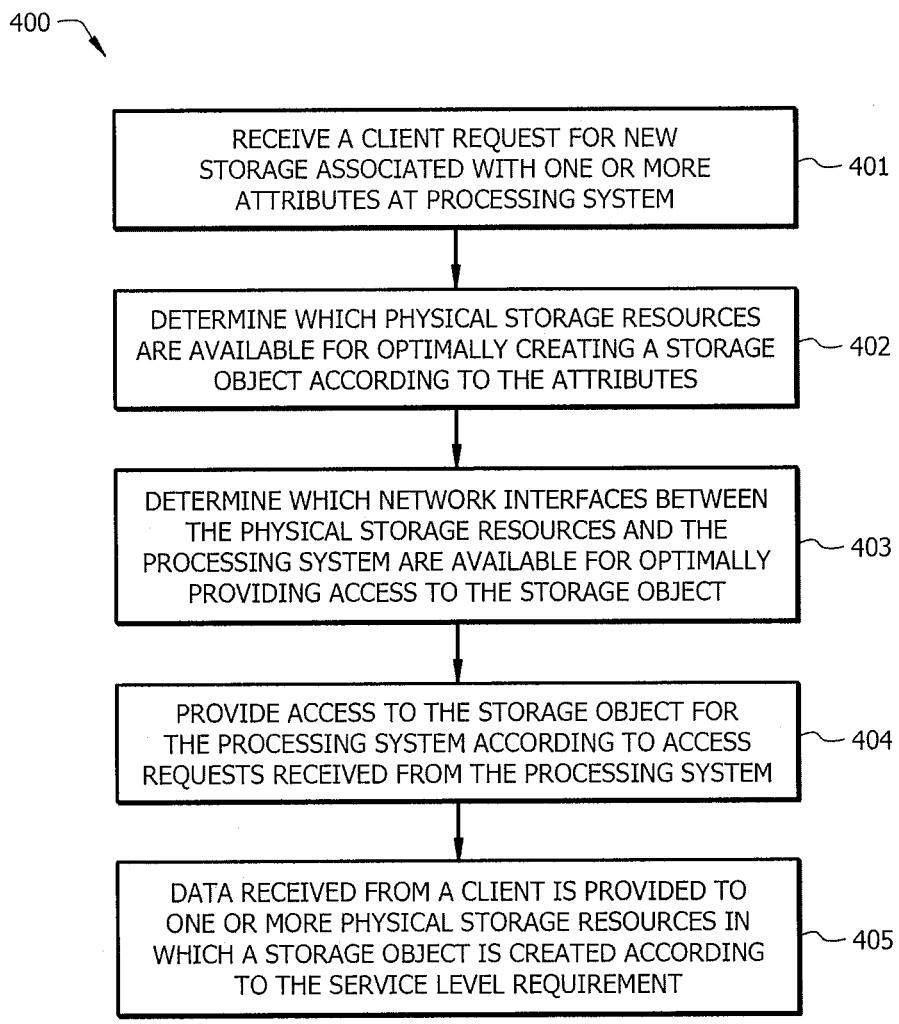
FIG. 4 is a block diagram illustrating steps performed according to a process to optimally create storage according to certain embodiments.

FIG. 4 is a block diagram illustrating steps to optimally create a storage object in a storage system and optimally provide access to the created storage object for a client by associating a processing system, such as a server system, with one or more physical storage resources. The steps illustrated at FIG. 4 may be carried out in system such as those illustrated at FIGS. 1A, 1B, and 3. At step 401, a processing system receives a client's request for new storage, where the new storage may be associated with one or more attributes such as a service level requirement. At step 402, physical storage resources within the storage system are examined to determine which of those resources are available for optimally creating a storage object according to the attributes associated with the newly requested storage. At step 403, network interfaces between the physical storage resources and the processing system are examined to determine which of those interfaces are available for optimally providing access to the storage object for the storage system according to the attributes associated with the newly requested storage. At step 404, access to the storage object for the processing system is provided by a server executing virtual storage controllers that access the storage objects according to access requests received from the processing system. At step 405, data received from a client is provided to one or more physical storage resources in which a storage object is created according to the service level requirement via the optimal network interface.

Figure 5:
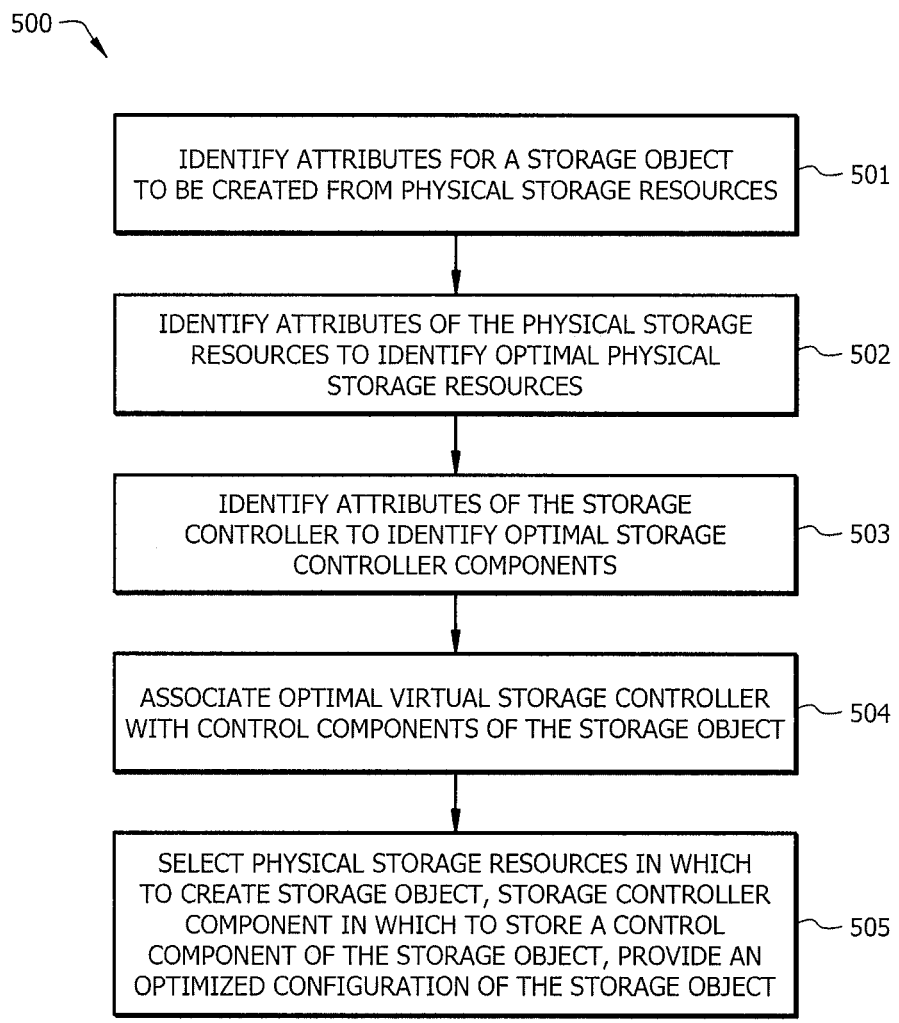
FIG. 5 is a block diagram illustrating steps performed according to a process to optimally create storage according to certain embodiments.

FIG. 5 is a block diagram illustrating steps to optimally create a storage object in a storage system and optimally provide access to the created storage object according to an embodiment. The steps illustrated at FIG. 5 may be carried out in systems such as those illustrated at FIGS. 1A, 1B, and 3. At step 501, attributes such as a service level requirement are identified for a storage object to be created from physical storage resources. The storage resources may be accessed by a storage controller. At step 502, attributes of the physical and virtual storage resources are examined to identify optimal storage resources that satisfy attributes associated with the created storage object. At step 503, attributes of the storage controller are examined to identify optimal storage controller components such as virtual storage controllers that satisfy attributes associated with the created storage object. Storage controller components may include virtual storage controllers executing on a server under the control of the storage controller which may access the storage object. At step 504, the optimal virtual storage controller is associated with control components of the storage object, such as operational files of the created storage object. At step 505, physical storage resources are selected in which to create the storage object and a storage controller component is selected in which to store a control component of the storage object to provide an optimized configuration of the created storage object.

Some embodiments may be conveniently implemented using a conventional general purpose or a specialized digital computer or microprocessor programmed according to the teachings herein, as will be apparent to those skilled in the art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill in the art would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module or software layer described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for configuring logical storage resources within a storage system node, said method comprising:
    receiving, at a storage system device, a request to create a new virtual storage object,
    wherein the request includes a service level requirement that is associated with the new virtual storage object;
    in response to the request:
        identifying, with the storage system device, one or more physical storage resources for the new virtual storage object based on said service level requirement; and
        identifying, with the storage system device, one or more storage controller, and one or more network interfaces to be used with the new virtual storage object based on said service level requirement;
    ranking, with the storage system device, the identified physical storage resource, storage controllers, and network interfaces, wherein the physical storage resources are ranked based on:
        a degree of similarity between an expected data access pattern of the new virtual storage object and a data access pattern of a virtual storage object configured within the storage system node; and
        a degree of similarity between a type of data stored by the physical storage resources and a type of data to be stored by the new virtual storage object;
    determining, with the storage system device, an optimal configuration based on the ranking, the optimal configuration comprising one or more of the physical storage resources, one of the storage controllers, and one or the network interfaces; and
    creating, with the storage system device, said new virtual storage object within the storage system node based on the optimal configuration and from at least one of said one or more physical storage resources of the optimal configuration.

2. The method of claim 1, wherein the creating further comprises creating said new virtual storage object from a highest ranking one of the physical storage resources, wherein said ranking is based, at least in part, on other storage objects previously created in said physical storage resources.

3. The method of claim 1, wherein said request further comprises a request for additional storage or a notification that storage is to be rebalanced.

4. The method of claim 1, further comprising providing, with the storage system device, data received from a client device to one or more physical storage resources included in the determined optimal configuration according to said service level requirement via a network interface included in the optimal configuration.

5. The method of claim 1, further comprising reconfiguring, with the storage system device, said created new virtual storage object, wherein said reconfiguring is based, at least in part, on other created storage objects.

6. The method of claim 1, further comprising:
    determining, with the storage system device, that no network interface satisfies the service level requirement; and
    in response to determining that no network interface satisfies the service level requirement, creating, with the storage system device, at least a new network interface or a new physical storage resource.

7. A storage system device for configuring logical storage resources, comprising:
    a processor coupled to a memory and configured to execute programmed instructions stored in the memory to perform steps comprising:

receiving a request to create a new virtual storage object, wherein the request includes a service level requirement that is associated with the new virtual storage object;

in response to the request:
- identifying, with the storage system device, one or more physical storage resources for the new virtual storage object based on the service level requirement; and
- identifying, with the storage system device, one or more storage controllers, and one or more network interfaces to be used with the new virtual storage object based on said service level requirement;
- ranking the identified physical storage resources, storage controllers, and network interfaces, wherein the physical storage resources are ranked based on:
  - a degree of similarity between an expected data access pattern of the new virtual storage object and a data access pattern of a virtual storage object configured within the storage system node; and
  - a degree of similarity between a type of data stored by the physical storage resources and a type of data to be stored by the new virtual storage object;
- determining an optimal configuration based on the ranking, the optimal configuration comprising one or more of the physical storage resources, one of the storage controllers, and one of the network interfaces; and
- creating said new virtual storage object within the storage system node based on the optimal configuration and from at least one of said one or more physical storage resources of the optimal configuration.

8. The device of claim 7, wherein the creating further comprises creating said new virtual storage object from a highest ranking one of the physical storage resources, wherein said ranking is based, at least in part, on other storage objects previously created in said physical storage resources.

9. The device of claim 7, wherein said request further comprises a request for additional storage or a notification that storage is to be rebalanced.

10. The device of claim 7, wherein the processor coupled to the memory is further configured to execute programmed instructions stored in the memory to perform steps further comprising providing data received from a client device to one or more physical storage resources included in the determined optimal configuration according to said service level requirement via a network interface included in the optimal configuration.

11. The device of claim 7, wherein the processor coupled to the memory is further configured to execute programmed instructions stored in the memory to perform steps further comprising reconfiguring said created new virtual storage object, wherein said reconfiguring is based, at least in part, on other created storage objects.

12. The device of claim 7, wherein the processor coupled to the memory is further configured to execute programmed instructions stored in the memory to perform steps further comprising:
- determining, that no network interface satisfies the service level requirement; and
- in response to determining that no network interface satisfied the service level requirement, creating at least a new network interface or a new physical storage resource.

13. A non-transitory computer readable medium having stored thereon instructions for creating storage objects comprising machine executable code which when executed by a processor, causes the processor to perform steps comprising:

receiving a request to create a new virtual storage object, wherein the request includes a service level requirement that is associated with the new virtual storage object;

in response to the request:
- identifying, with the storage system device, one or more physical storage resources for the new virtual storage object based on the service level requirement; and
- identifying, with the storage system device, one or more storage controllers, and one or more network interfaces to be used with the new virtual storage object based on said service level requirement;
- ranking the identified physical storage resources, storage controllers, and network interfaces, wherein the physical storage resources are ranked based on:
  - a degree of similarity between an expected data access pattern of the new virtual storage object and a data access pattern of a virtual storage object configured within the storage system node; and
  - a degree of similarity between a type of data stored by the physical storage resources and a type of data to be stored by the new virtual storage object;
- determining an optimal configuration based on the ranking, the optimal configuration comprising one or more of the physical storage resources, one of the storage controllers, and one of the network interfaces; and
- creating said new virtual storage object within the storage system node based on the optimal configuration and from at least one or said one or more physical storage resources of the optimal configuration.

14. The medium of claim 13, wherein the creating further comprises creating said new virtual storage object from a highest ranking one of the physical storage resources, wherein said ranking is based, at least in part, on other storage objects previously created in said physical storage resources.

15. The medium of claim 13, wherein said request further comprises a request for additional storage or a notification that storage is to be rebalanced.

16. The medium of claim 13, further having stored thereon instructions comprising machine executable code which when executed by the processor, causes the processor to perform steps further comprising providing data received from a client device to one of more physical storage resources included in the determined optimal configuration according to said service level requirement via a network interface included in the optimal configuration.

17. The medium of claim 13, further having stored thereon instructions comprising machine executable code which when executed by the processor, causes the processor to perform steps further comprising reconfiguring said created new virtual storage object, wherein said reconfiguring is based, at least in part, on other created storage objects.

18. The medium of claim 13, further having stored thereon instructions comprising machine executable code which when executed by the processor, causes the processor to perform steps further comprising:
- determining, that no network interface satisfies the service level requirement; and
- in response to determining that no network interface satisfies the service level requirement, creating at least a new network interface or a new physical storage resource.

* * * * *